(12) United States Patent
Wong

(10) Patent No.: US 6,903,287 B2
(45) Date of Patent: Jun. 7, 2005

(54) LIQUID METAL OPTICAL RELAY

(75) Inventor: Marvin Glenn Wong, Woodland Park, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 372 days.

(21) Appl. No.: 10/413,267

(22) Filed: Apr. 14, 2003

(65) Prior Publication Data

US 2004/0201907 A1 Oct. 14, 2004

(51) Int. Cl.⁷ .................................. H01H 29/00
(52) U.S. Cl. ............... 200/182; 200/187; 200/215; 200/233
(58) Field of Search .................. 335/47–50, 57, 335/58; 200/182, 183, 187–194, 214–236

(56) References Cited

U.S. PATENT DOCUMENTS

| | | |
|---|---|---|
| 2,312,672 A | 3/1943 | Pollard, Jr. |
| 2,564,081 A | 8/1951 | Schilling |
| 3,430,020 A | 2/1969 | Von Tomkewitsch et al. |
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,200,779 A | 4/1980 | Zakurdaev et al. |
| 4,238,748 A | 12/1980 | Goullin et al. |
| 4,245,886 A * | 1/1981 | Kolodzey et al. ............ 385/19 |
| 4,336,570 A | 6/1982 | Brower |
| 4,419,650 A | 12/1983 | John |
| 4,434,337 A | 2/1984 | Becker |
| 4,475,033 A | 10/1984 | Willemsen et al. |

(Continued)

FOREIGN PATENT DOCUMENTS

| | | |
|---|---|---|
| EP | 0593836 A1 | 4/1994 |
| EP | 1 014 140 | 12/1999 |
| EP | 1 221 633 | 2/2002 |
| FR | 2418539 | 9/1979 |
| FR | 2458138 | 12/1980 |

(Continued)

OTHER PUBLICATIONS

Jonathan Simon, "A Liquid–Filled Microrelay With A Moving Mercury Microdrop" (Sep. 1997), Journal of Microelectromechinical Systems, vol. 6, No. 3, pp 208–216.

(Continued)

*Primary Examiner*—Ramon M. Barrera

(57) ABSTRACT

An optical relay is disclosed in which a liquid metal droplet is moved within a switching channel formed in relay housing. An optical path passing through the switching channel is blocked or unblocked by motion of the liquid metal droplet that coalesces with one of two additional liquid metal droplets. Motion of the liquid metal droplets is controlled by heaters that control the pressure of an actuation gas in the switching channel. The liquid metal droplets are held in place by surface tension acting on wettable contact pads within the switching channel. The surface tension of the liquid provides a latching mechanism for the relay. The pressure of the actuation gas is increased by direct heating of the gas or by heating a phase-change liquid to cause it to evaporate.

21 Claims, 4 Drawing Sheets

U.S. PATENT DOCUMENTS

| | | | |
|---|---|---|---|
| 4,505,539 A * | 3/1985 | Auracher et al. | 385/19 |
| 4,582,391 A * | 4/1986 | Legrand | 385/17 |
| 4,628,161 A | 12/1986 | Thackrey | |
| 4,652,710 A | 3/1987 | Karnowsky et al. | |
| 4,657,339 A | 4/1987 | Fick | |
| 4,742,263 A | 5/1988 | Harnden, Jr. et al. | |
| 4,786,130 A | 11/1988 | Georgiou et al. | |
| 4,797,519 A | 1/1989 | Elenbaas | |
| 4,804,932 A | 2/1989 | Akanuma et al. | |
| 4,988,157 A * | 1/1991 | Jackel et al. | 385/17 |
| 5,278,012 A | 1/1994 | Yamanaka et al. | |
| 5,415,026 A | 5/1995 | Ford | |
| 5,502,781 A | 3/1996 | Li et al. | |
| 5,644,676 A | 7/1997 | Blomberg et al. | |
| 5,675,310 A | 10/1997 | Wojnarowski et al. | |
| 5,677,823 A | 10/1997 | Smith | |
| 5,751,074 A | 5/1998 | Prior et al. | |
| 5,751,552 A | 5/1998 | Scanlan et al. | |
| 5,828,799 A * | 10/1998 | Donald | 385/16 |
| 5,841,686 A | 11/1998 | Chu et al. | |
| 5,849,623 A | 12/1998 | Wojnarowski et al. | |
| 5,874,770 A | 2/1999 | Saia et al. | |
| 5,875,531 A | 3/1999 | Nellissen et al. | |
| 5,886,407 A | 3/1999 | Polese et al. | |
| 5,889,325 A | 3/1999 | Uchida et al. | |
| 5,912,606 A | 6/1999 | Nathanson et al. | |
| 5,915,050 A | 6/1999 | Russell et al. | |
| 5,972,737 A | 10/1999 | Polese et al. | |
| 5,994,750 A | 11/1999 | Yagi | |
| 6,021,048 A | 2/2000 | Smith | |
| 6,180,873 B1 | 1/2001 | Bitko | |
| 6,201,682 B1 | 3/2001 | Mooij et al. | |
| 6,207,234 B1 | 3/2001 | Jiang | |
| 6,212,308 B1 * | 4/2001 | Donald | 385/16 |
| 6,225,133 B1 | 5/2001 | Yamamichi et al. | |
| 6,278,541 B1 | 8/2001 | Baker | |
| 6,304,450 B1 | 10/2001 | Dibene, II et al. | |
| 6,320,994 B1 | 11/2001 | Donald et al. | |
| 6,323,447 B1 | 11/2001 | Kondoh et al. | |
| 6,351,579 B1 | 2/2002 | Early et al. | |
| 6,356,679 B1 * | 3/2002 | Kapany | 385/18 |
| 6,360,775 B1 * | 3/2002 | Barth et al. | 137/828 |
| 6,373,356 B1 | 4/2002 | Gutierrez et al. | |
| 6,396,012 B1 | 5/2002 | Bloomfield | |
| 6,396,371 B2 | 5/2002 | Streeter et al. | |
| 6,408,112 B1 | 6/2002 | Bartels | |
| 6,446,317 B1 | 9/2002 | Figueroa et al. | |
| 6,453,086 B1 | 9/2002 | Tarazona | |
| 6,470,106 B2 * | 10/2002 | McClelland et al. | 385/16 |
| 6,487,333 B2 | 11/2002 | Fouquet | |
| 6,501,354 B1 | 12/2002 | Gutierrez et al. | |
| 6,512,322 B1 | 1/2003 | Fong et al. | |
| 6,515,404 B1 | 2/2003 | Wong | |
| 6,516,504 B2 | 2/2003 | Schaper | |
| 6,559,420 B1 | 5/2003 | Zarev | |
| 6,633,213 B1 | 10/2003 | Dove | |
| 2002/0037128 A1 | 3/2002 | Burger et al. | |
| 2002/0146197 A1 | 10/2002 | Yong | |
| 2002/0150323 A1 | 10/2002 | Nishida et al. | |
| 2002/0168133 A1 | 11/2002 | Saito | |
| 2003/0012483 A1 | 1/2003 | Ticknor et al. | |
| 2003/0035611 A1 | 2/2003 | Shi | |

FOREIGN PATENT DOCUMENTS

| | | |
|---|---|---|
| FR | 2667396 | 4/1982 |
| JP | SHO 36-18575 | 10/1961 |
| JP | SHO 47-21645 | 10/1972 |
| JP | 62-276838 | 12/1987 |
| JP | 83-294317 | 12/1988 |
| JP | 9161640 | 6/1997 |
| JP | 8-126487 | 5/1998 |
| WO | WO99/46624 | 12/1999 |

OTHER PUBLICATIONS

Marvin Glenn Wong, "A Piezoelectrically Actuated Liquid Metal Switch", May 2, 2002, patent application (pending, 12 pages of specification, 5 pages of claims, 1 page of abstract, and 10 sheets of drawings (Figs. 1–10).

Bhedwar, Homi C. et al. "Ceramic Multilayer Package Fabrication," Electronic Materials Handbook, Nov. 1989, pp. 460–469, vol. 1 Packaging, Section 4: Packages.

Kim, Joonwon et al. "A Micromechanical Switch with Electrostatically Driven Liquid–Metal Droplet," Sensors and Actuators, A: Physical, v 9798, Apr. 1, 2002, 4 pages.

* cited by examiner

LIQUID METAL OPTICAL RELAY

CROSS REFERENCE TO RELATED APPLICATIONS

This application is related to the following co-pending U.S. Patent Applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", having the same filing date as the present application and identified by Ser. No. 10/413,068;

Application 10010531-1, "High Frequency Bending Mode Latching Relay", having the same filing date as the present application and identified by Ser. No. 10/412,912;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", having the same filing date as the present application and identified by Ser. No. 10/412,991;

Application 10010572-1, "Liquid Metal, Latching Relay with Face Contact", having the same filing date as the present application and identified by Ser. No. 10/413,195;

Application 10010573-1, "Insertion Type Liquid Metal Latching Relay", and having the same filing date as the present application and identified by Ser. No. 10/412,824;

Application 10010617-1, "High-frequency, Liquid Metal, Latching Relay Array", having the same filing date as the present application and identified by Ser. No. 10/413,278;

Application 10010618-1, "Insertion Type Liquid Metal Latching Relay Array", having the same filing date as the present application and identified by Ser. No. 10/412,880;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", having the same filing date as the present application and identified by Ser. No. 10/413,314;

Application 10010644-1, "Bending Mode Liquid Metal Switch", having the same filing date as the present application and identified by Ser. No. 10/413,328;

Application 10010656-1, titled "A Longitudinal Mode Optical Latching Relay", having the same filing date as the present application and identified by Ser. No. 10/413,215;

Application 10010663-1, "Method and Structure for a Pusher-Mode Piezoelectrically Actuated Liquid Metal Switch", having the same filing date as the present application and identified by Ser. No. 10/413,098;

Application 10010664-1, "Method and Structure for a Pusher-Mode Piezoelectrically Actuated Liquid Metal Optical Switch", having the same filing date as the present application and identified by Ser. No. 104/412,895;

Application 10010790-1, titled "Switch and Production Thereof", filed Dec. 12, 2002 and identified by Ser. No. 10/317,597;

Application 10011055-1, "High Frequency Latching Relay with Bending Switch Bar", having the same filing date as the present application and identified by Ser. No. 10/413,237;

Application 10011056-1, "Latching Relay with Switch Bar", having the same filing date as the present application and identified by Ser. No. 10/413,099;

Application 10011064-1, "High Frequency Push-mode Latching Relay", having the same filing date as the present application and identified by Ser. No. 10/413,100;

Application 10011065-1, "Push-mode Latching Relay", having the same filing date as the present application and identified by Ser. No. 10/413,067;

Application 10011121-1, "Closed Loop Piezoelectric Pump", having the same filing date as the present application and identified by Ser. No. 10/412,857;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", having the same filing date as the present application and identified by Ser. No. 10/412,869;

Application 10011345-1, "Method and Structure for a Slug Assisted Longitudinal Piezoelectrically Actuated Liquid Metal Optical Switch", having the same filing date as the present application and identified by Ser. No. 10/412,916;

Application 10011397-1, "Method and Structure for a Slug Assisted Pusher-Mode Piezoelectrically Actuated Liquid Metal Optical Switch", having the same filing date as the present application and identified by Ser. No. 10/413,070;

Application 10011398-1, "Polymeric Liquid Metal Switch", having the same filing date as the present application and identified by Ser. No. 10/413,094;

Application 10011410-1, "Polymeric Liquid Metal Optical Switch", having the same filing date as the present application and identified by Ser. No. 10/412,859;

Application 10011436-1, "Longitudinal Electromagnetic Latching Optical Relay", having the same filing date as the present application and identified by Ser. No. 10/412,868;

Application 10011437-1, "Longitudinal Electromagnetic Latching Relay", having the same filing date as the present application and identified by Ser. No. 10/412,329;

Application 10011458-1, "Damped Longitudinal Mode Optical Latching Relay", having the same filing date as the present application and identified by Ser. No. 10/412,894;

Application 10011459-1, "Damped Longitudinal Mode Latching Relay", having the same filing date as the present application and identified by Ser. No. 10/412,914;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020231-1, titled "Ceramic Channel Plate for a Switch", filed Dec. 12, 2000 and identified by Ser. No. 10/317,960;

Application 10020241-1, "Method and Apparatus for Maintaining a Liquid Metal Switch in a Ready-to-Switch Condition", having the same filing date as the present application and identified by Ser. No. 10/413,002;

Application 10020242-1, titled "A Longitudinal Mode Solid Slug Optical Latching Relay", having the same filing date as the present application and identified by Ser. No. 10/412,858;

Application 10020473-1, titled "Reflecting Wedge Optical Wavelength Multiplexer/Demultiplexer", having the same filing date as the present application and identified by Ser. No. 10/413,270;

Application 10020540-1, "Method and Structure for a Solid Slug Caterpillar Piezoelectric Relay", having the same filing date as the present application and identified by Ser. No. 10/413,088;

Application 10020541-1, titled "Method and Structure for a Solid Slug Caterpillar Piezoelectric Optical Relay", having the same filing date as the present application and identified by Ser. No. 10/413,196;

Application 10020698-1, "Laser Cut Channel Plate for a Switch", filed Dec. 12, 2002 and identified by Ser. No. 10/317,932;

Application 10030438-1, "Inserting-finger Liquid Metal Relay", having the same filing date as the present application and identified by Ser. No. 10/413,187;

Application 10030440-1, "Wetting Finger Liquid Metal Latching Relay", having the same filing date as the present application and identified by Ser. No. 10/413,058;

Application 10030521-1, "Pressure Actuated Optical Latching Relay", having the same filing date as the present application and identified by Ser. No. 10/412,874;

Application 10030522-1, "Pressure Actuated Solid Slug Optical Latching Relay", having the same filing date as the present application and identified by Ser. No. 10/413,162; and Application 10030546-1, "Method and Structure for a Slug Caterpillar Piezoelectric Reflective Optical Relay", having the same filing date as the present application and identified by Ser. No. 10/412,910.

FIELD OF THE INVENTION

The invention relates to the field of optical switching relays, and in particular to an optical relay that is actuated by gas pressurization and latches by means of liquid surface tension.

BACKGROUND OF THE INVENTION

Communications systems using optical signals require the use of optical switches and routers. An early approach to optical switching was to convert the optical signal to an electrical signal, use an electrical switch or router and then convert back to an optical signal. More recently, optical relays have been used in which an electrical control signal is used to control the switching or routing of an optical signal. Optical relays typically switch optical signals by using movable solid mirrors or by using the creation of vapor bubbles to alter the index of refraction inside a cavity. The moveable mirrors may use electrostatic latching mechanisms, whereas bubble switches do not latch. Piezoelectric latching relays either use residual charges in the piezoelectric material to latch, or actuate switch contacts containing a latching mechanism.

Liquid metal is also used in electrical relays. A liquid metal droplet can be moved by a variety of techniques, including electrostatic forces, variable geometry due to thermal expansion/contraction, and pressure gradients. When the dimension of interest shrinks, the surface tension of the liquid metal becomes dominant force over other forces, such as body forces (inertia). Consequently, some micro-electro-mechanical (MEM) systems utilize liquid metal switching.

SUMMARY OF THE INVENTION

The present invention relates to an optical switch in which a liquid metal droplet is moved within a channel and used to block or unblock an optical path passing through the channel. The liquid metal droplet is moved by the pressurization of gas in a heater chamber that results in a pressure change in the channel. The liquid metal droplet adheres to wettable metal contact pads within the channel to provide a latching mechanism.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
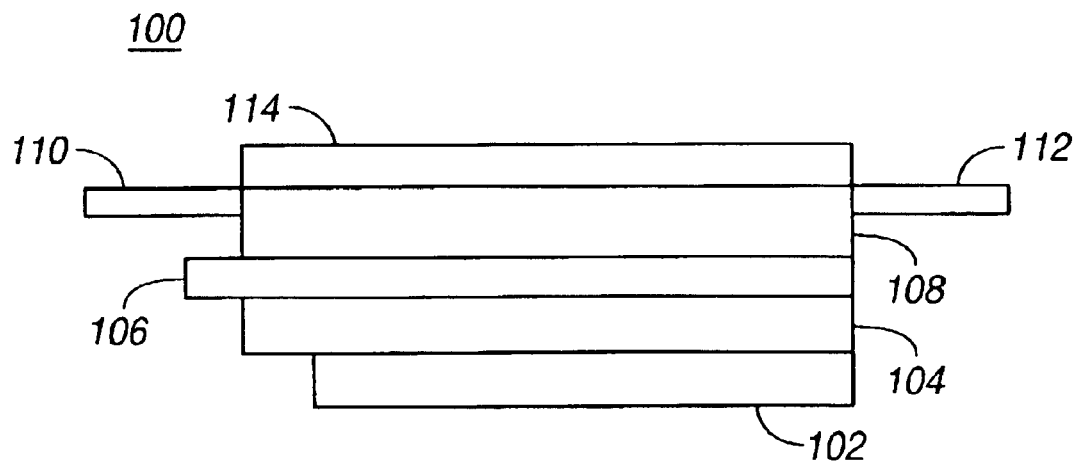
FIG. 1 is an end view of an optical relay of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The present invention relates to optical relay that is actuated by gas pressurization and latches by means of a liquid metal droplet moving within a switching channel. In the preferred embodiment, the relay uses heating element to induce pressure changes in an actuation gas that in turn displaces the liquid metal. The liquid metal blocks or unblocks an optical path, allowing the switching of optical signals. The liquid metal, which may be mercury or an alloy that contains gallium, wets at least one fixed contact pad on the relay housing and is held in place by surface tension.

In one embodiment, micro-machining techniques are used to manufacture the relay. An end view of an optical relay 100 is shown in FIG. 1. In this embodiment, the body of the relay is made up of six layers and is amenable to manufacture by micro-machining. The lowest layer is a bottom cap layer 102. The next layer is a chamber layer 104 that incorporates heater chambers and, optionally, a phase-change liquid. The next layer is a circuit layer 106 containing ducts (vias) that couple the heater chambers to the switching channel. The circuit layer also supports heater resistors and the associated electrical circuitry. Switching of the optical signal occurs in the switching channel contained in the switching layer 108. In operation, an optical signal enters the relay through an optical fiber or waveguide 110 and, if not blocked in the relay, exits through optical fiber or waveguide 112. The final layer is a top cap layer 114.

Figure 2:
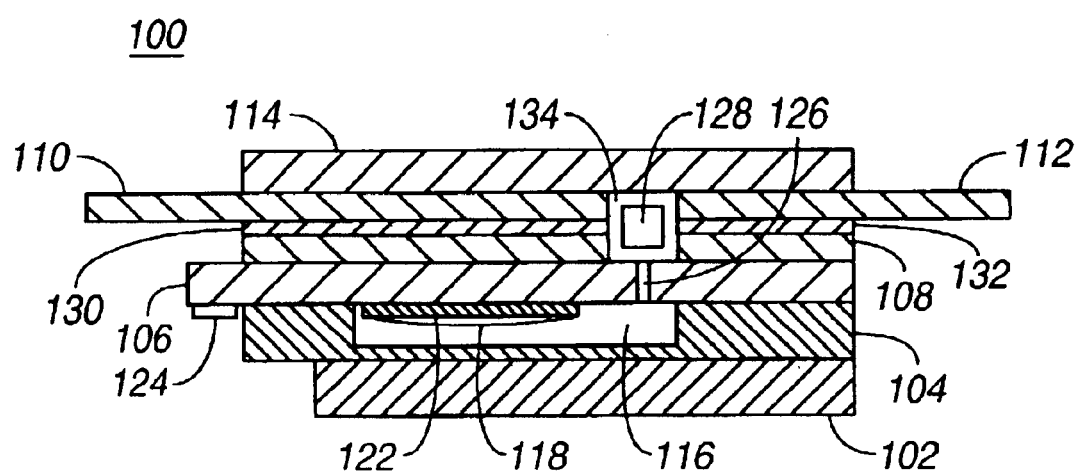
FIG. 2 is a sectional view of optical relay of the present invention.

FIG. 2 is a cross-sectional of the relay in FIG. 1. The lowest layer is a bottom cap layer 102. The next layer is the chamber layer 104 that incorporates the heater chamber 116, the heater resistor 122 and, optionally, a phase-change liquid 118. In operation, the heater resistor 122 increases the pressure in an actuation gas contained on the heater chamber 116. In a first embodiment of the invention, the pressure increase is created by direct heating of the gas in the chamber. In a second embodiment, the pressure increase is created by heating a liquid 118 so that it changes from a liquid phase to a gas phase. The volume increase associated with the phase change produces a pressure increase in the actuation gas. One advantage of this approach is that heat is more efficiently passed from the heater resistor to a liquid than from the heater resistor to a gas. In addition, the phase transition can be very rapid and results in a large pressure change. This leads to more rapid switching and reduces energy losses into the substrate. The phase change is reversible, so that the vapor condenses on the heater resistor as it cools. The phase-change liquid may be an inert organic liquid such as a low viscosity 3M Flourinert. Alternatively, the phase-change liquid may be a liquid metal. A restrictive pressure relief passage between the heater chambers may be included to allow the pressure to equalize slowly across the changes to prevent the liquid metal in the switching channel from being drawn back as the heater cools. The next layer is the circuit layer 106 containing a duct 126 that couples the heater chamber 116 to the switching channel 128 (contained in the switching layer 108). In operation, an optical signal enters the relay through an optical fiber or waveguide 110 and, if not blocked in the relay, exits through optical fiber or waveguide 112. The optical waveguide 110 is embedded in a notch 130 in the switching layer 108. The optical waveguide 112 is embedded in a notch 132 in the switching layer 108. Wettable contact pads 134 are fixed to the inside of the switching channel 128. The contact pads may be made of seal belt metal. Each pad made be made in four pieces: a lower pad attached to the top of the circuit layer, two side pads attached to the sides of the switching channel in the switching layer, and a top pad attached to the lower surface of the top cap layer. The liquid metal used for switching is held in contact with these pads by surface tension. The final layer is a top cap layer 114, which provides a cap for the switching channel.

Figure 3:
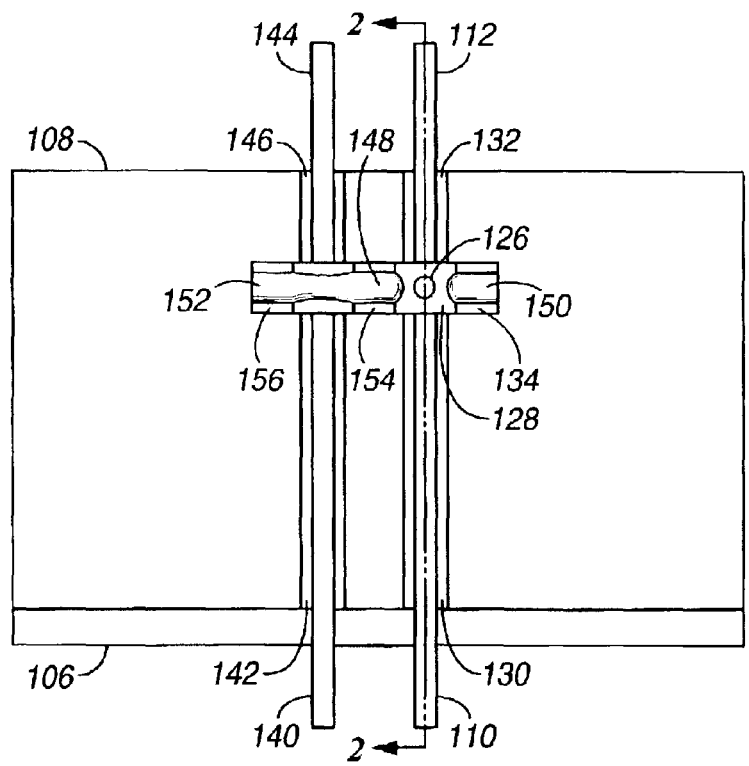
FIG. 3 is a top view of an optical relay of the present invention with the top cap layer removed.

A view of the optical relay with the top cap layer removed is shown in FIG. 3. The switching layer 108 is positioned above the circuit layer 106. An optical waveguide 110, embedded in a notch 130 in the switching layer 108, is optically aligned with the optical waveguide 112 (embedded in a notch 132). For light to couple between the waveguides 110 and 112 it must pass through the transparent actuation gas in the switching channel 128. Optical waveguide 140, embedded in a notch 142 in the switching layer 108, is optically aligned with the optical waveguide 144 (embedded in a notch 146). A central droplet of liquid metal 148 is positioned within the switching channel 128 and is held in wetted contact with the contact pad 154. In the preferred embodiment, the liquid metal is mercury or an alloy containing gallium. The central liquid metal droplet 148 may be moved to coalesce with one of the further liquid metal droplets 150 and 152. The liquid metal droplets 150 and 154 are in wetted contact with contact pads 134 and 156, respectively. The total volume of liquid metal is chosen so that only two volumes may coalesce at one time. The contact pads may be made of seal belt metal, for example. Each belt is made up of four elements, two attached to the switching layer 108, one attached to the top of circuit layer 106 and one attached to the underside of the top cap layer 114. Surface tension in the liquid metal droplets resists motion of the liquid. When the liquid metal droplets 148 and 152 are coalesced, as shown in FIG. 3, there is no gap between the droplets through which light can pass, so the optical path between the waveguides 140 and 144 is blocked. However, light may pass through the gap between liquid metal droplets 148 and 150, so the optical path between waveguides 110 and 112 is open. The section 2—2 is shown in FIG. 2, and is described above.

Figure 4:
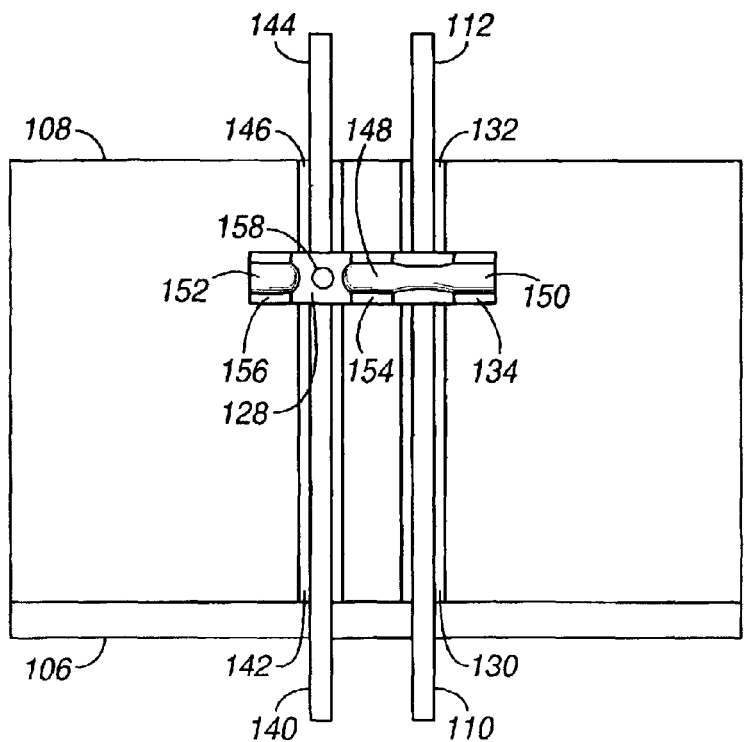
FIG. 4 is a further top view of an optical relay of the present invention with the top cap layer removed.

Motion of the liquid droplets is controlled by a transparent, inert, electrically non-conducting actuation gas that fills the interior of the relay surrounding the liquid metal droplets. The actuation gas moves into or out of the switching channel 128 through vias or ducts positioned between the contact pads. The central droplet of liquid metal 148 can be separated from droplet 152 by increasing the pressure of the actuation gas on the left side of the central contact pads (154, 148). The resulting pressure difference across the central liquid metal droplet 148 moves it to the right, as shown in FIG. 4, where it coalesces with the droplet 150. When the pressure in the actuation gas is equalized, the central droplet 148 remains coalesced with the droplet 150 because of surface tension in the liquid metal. Surface tension also holds the coalesced droplets to the contact pads 134 and 154. The optical path between waveguides 140 and 144 is now opened, whereas the optical path between waveguides 110 and 112 is blocked by the liquid metal.

Figure 5:
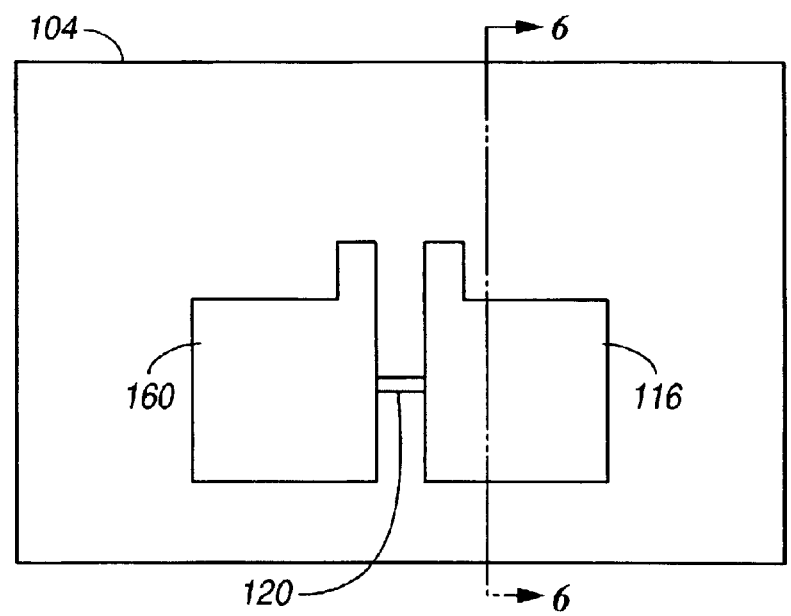
FIG. 5 is top view of a chamber layer of an optical relay of the present invention.

FIG. 5 is a top view of the chamber layer 104 of the relay. Two heater chambers 116 and 160 are formed in the layer. The chambers are completed by the bottom cap layer below and by the circuit layer above. Optionally, a pressure relief duct 120 couples the heater chambers and allows for slow pressure equalization between the chambers. Gas flow through the duct is restricted so as not to impair switching.

Figure 6:
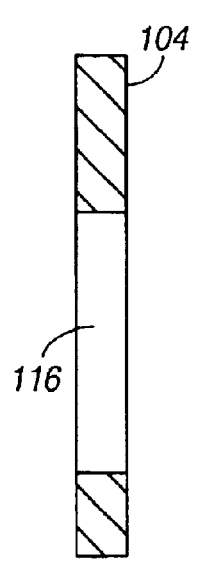
FIG. 6 is sectional view through a chamber layer of an optical relay of the present invention.

FIG. 6 is a sectional view through the section 6—6 of the chamber layer 104 shown in FIG. 5. The heater chamber 116 is formed as a cavity in the layer.

Figure 7:
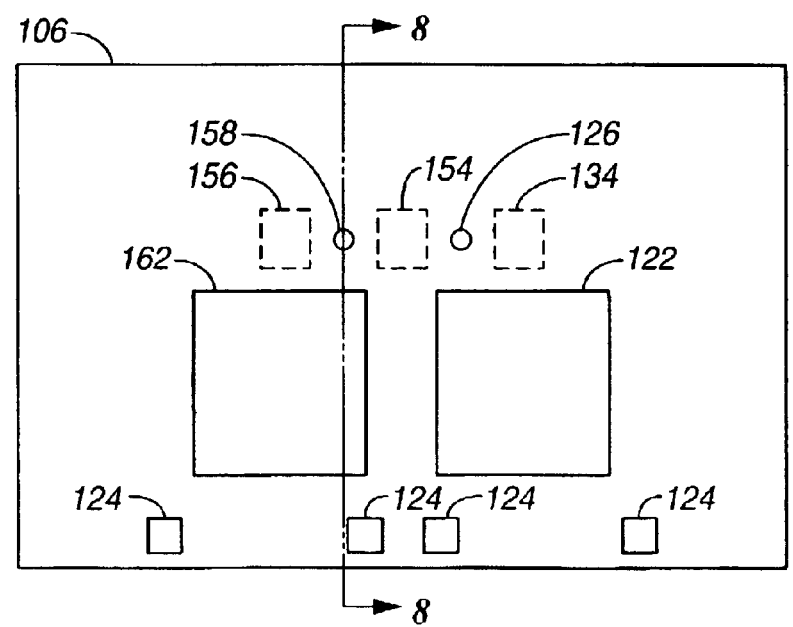
FIG. 7 is bottom view of a circuit layer of an optical relay of the present invention.

FIG. 7 is a bottom view of the circuit layer 106 of the relay. Vias or ducts 126 and 158 allow passage of actuation gas from the heater chambers to pass through the circuit layer to the switching channel. The lowermost portions of the wettable contact pads 134, 154 and 156 (depicted by broken lines) are formed on or attached to the upper surface of the layer and are combined with other portions of the pads in the switching channel and on the top cap layer. Heater resistors 122 and 162 are formed on the circuit layer. After assembly, the heater resistors are positioned in the heater chambers. Electrical contact pads 124 facilitate connection of control signals to the heater resistors 122. Electrical traces (not shown) formed on the circuit layer connect the electrical contact pads 124 to the heater resistors.

Figure 8:
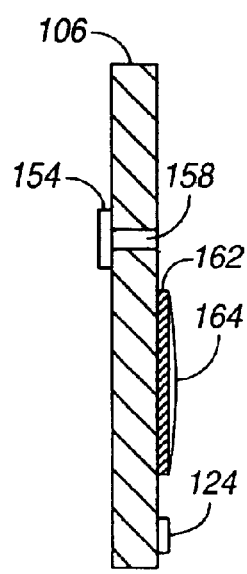
FIG. 8 is sectional view through a circuit layer of an optical relay of the present invention.

FIG. 8 is a sectional view through the section 8—8 of the circuit layer 106 shown in FIG. 7. The gas duct 158 passes through the layer. The wettable contact pad 154 is attached to the top surface of the layer 106. The heater resistor 162 and the electrical contact pad 124 are attached to the underside of the layer. Optionally, a phase-change liquid 164 wets the surface of the heater resistor 162. This liquid may be added after or during assembly of the relay.

Figure 9:
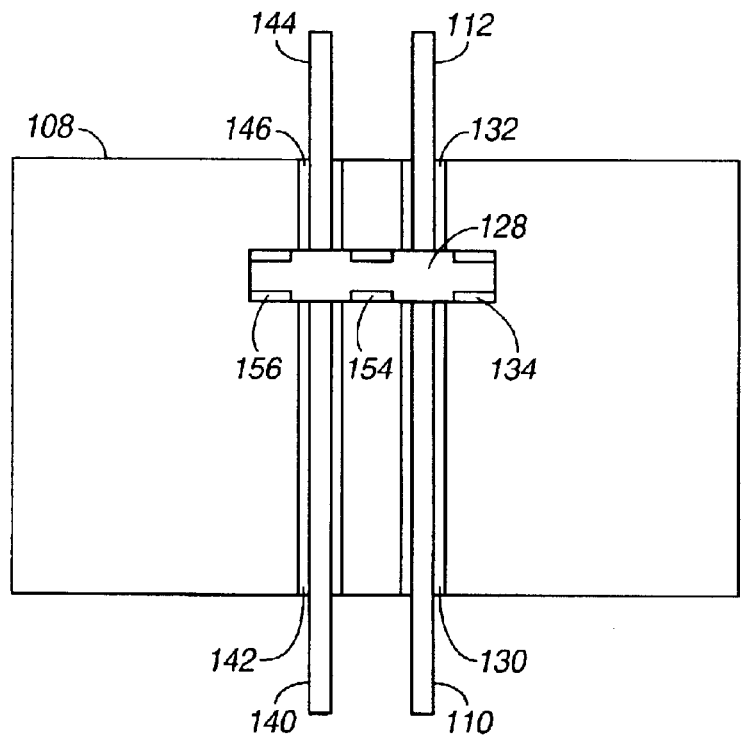
FIG. 9 is top view of a switching layer of an optical relay of the present invention.

FIG. 9 is a top view of the switching layer 108 of the relay. Optical waveguide 110, embedded in a notch 130 in the switching layer 108, is optically aligned with the optical waveguide 112 (embedded in a notch 132). Optical waveguide 140, embedded in a notch 142 in the switching layer 108, is optically aligned with the optical waveguide 144 (embedded in a notch 146). Portions of the wettable contact pads 134, 154 and 156 are fixed to the inside of the switching channel 128.

Figure 10:
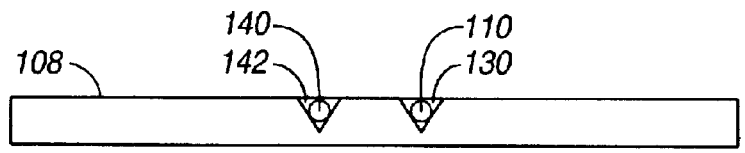
FIG. 10 is side view of a switching layer of an optical relay of the present invention.

A side view of the switching layer 108 is shown in FIG. 10. The optical waveguides 110 and 140 are imbedded in triangular notches 130 and 142 in the top surface of the layer. The use of notches allows for accurate optical alignment of the waveguides during assembly of the relay.

Figure 11:
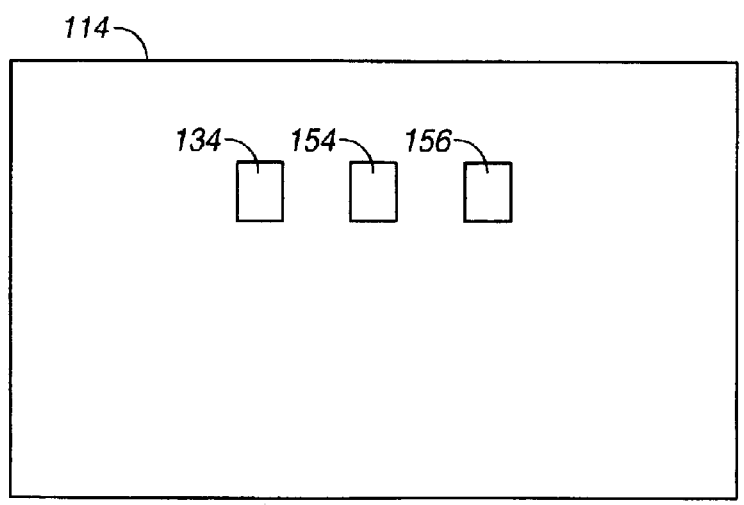
FIG. 11 is bottom view of a top cap layer of an optical relay of the present invention.

FIG. 11 is a bottom view of the top cap layer 114 of the relay. The topmost portions of the wettable contact pads 134, 154 and 156 are formed or attached to the lower surface of the layer and combined with other portions in the switching channel and the circuit layer.

The optical relay of the present invention can be made using micro-machining techniques for small size.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An optical relay comprising:
   a relay housing containing a switching channel;
   first and second contact pads located in the switching channel and each having a surface wettable by a liquid metal;
   a third contact pad located in the switching channel between the first and second contact pads and having a surface wettable by a liquid metal;
   a first liquid metal droplet in wetted contact with the first contact pad;
   a second liquid metal droplet in wetted contact with the second contact pad;
   a third liquid metal droplet in wetted contact with the third contact pad and adapted to move within the switching channel to coalesce with one of the first liquid metal droplet and the second liquid metal droplet;
   a first optical path passing through the switching channel between the first and third liquid metal droplets;
   a first heater comprising:
      a first heater chamber containing a first actuation gas;
      a first gas duct coupling the first heater chamber to the switching channel between the first and third contact pads; and
      a first heater resistor operable to increase the pressure of the first actuation gas, thereby causing the first and third liquid metal droplets to separate and the second and third liquid metal droplets to coalesce; and
   a second heater comprising:
      a second heater chamber containing a second actuation gas;
      a second gas duct coupling the second heater chamber to the switching channel between the second and third contact pads; and
      a second heater resistor operable to increase the pressure of the second actuation gas, thereby causing the second and third liquid metal droplets to separate and the first and third liquid metal droplets to coalesce,
   wherein the first optical path is broken when the first and third liquid metal droplets are coalesced and is completed when the first and third liquid metal droplets are separated.

2. An optical relay in accordance with claim 1, wherein the first optical path comprises:
   a first optical waveguide configured to transmit light into the switching channel; and
   a second optical waveguide, optically aligned with the first optical waveguide and configured to receive light from the first optical waveguide when the first and third liquid metal droplets are separated.

3. An optical relay in accordance with claim 1, further comprising a second optical path, passing between the second and third liquid metal droplets.

4. An optical relay in accordance with claim 1, further comprising:
   a first phase-change liquid in wetted contact with the first heater resistor and adapted to change phase when the first heater resistor is energized; and
   a second phase-change liquid in wetted contact with the second heater resistor and adapted to change phase when the second heater resistor is energized.

5. An optical relay in accordance with claim 4, further comprising a pressure relief passage opening to the first heater chamber and the second heater chamber.

6. An optical relay in accordance with claim 4, wherein the first and second phase-change liquids are inert, inorganic liquids.

7. An optical relay in accordance with claim 4, wherein the first and second phase-change liquids are liquid metals.

8. An optical relay in accordance with claim 1, wherein the relay housing comprises:
   a bottom cap layer;
   a circuit layer supporting the first and second heater resistors and electrical connections thereto and containing the first and second gas ducts;
   a heater chamber layer positioned between the bottom cap layer and the circuit layer and containing the first and second heater chambers;
   a switching layer positioned above the circuit layer and having the switching channel formed therein; and
   a top cap layer, positioned above the switching layer.

9. An optical relay in accordance with claim 8, wherein the first optical path comprises:
   a first optical waveguide embedded in a first notch in the switching layer and configured to transmit light into the switching channel; and
   a second optical waveguide embedded in a second notch in the switching layer and optically aligned with the first optical waveguide, the second optical waveguide being configured to receive light from the first optical waveguide if the first and third liquid metal droplets are separated.

10. An optical relay in accordance with claim 8, wherein:
a first portion of the first, second and third contact pads is formed on the upper surface of the circuit layer;
a second portion of the first, second and third contact pads is formed on the sides of the switching channel in the switching layer; and
a third portion of the first, second and third contact pads is formed on the lower surface of the top cap layer.

11. An optical relay in accordance with claim 1, wherein the liquid metal is one of mercury and an alloy containing gallium.

12. A method for switching a first optical path in a optical relay having a first liquid metal droplet moveable within a switching channel, the method comprising:
coupling a first input optical signal to a first input optical waveguide of the optical relay, the first input optical waveguide being optically aligned with a first output optical waveguide to form the first optical path;
if the first optical path is to be completed:
moving the first liquid metal droplet out of the first optical path, whereby the first input optical waveguide is optically coupled to the first output optical waveguide; and
if the first optical path is to be broken:
moving the first liquid metal droplet into the first optical path, whereby the first input optical waveguide is optically decoupled from the first output optical waveguide,
wherein moving the first liquid metal droplet comprises pressuring an actuation gas in the switching channel to create a pressure difference across the first liquid metal droplet.

13. A method in accordance with claim 12, wherein the first liquid metal droplet is in wetted contact with a first contact pad positioned in the switching channel between a second contact pad and a third contact pad and wherein:
moving the first liquid metal droplet into the optical path causes the first liquid metal droplet to coalesce with a second liquid metal droplet in wetted contact with the second contact pad; and
moving the first liquid metal droplet out of the optical path causes the first liquid metal droplet to coalesce with a third liquid metal droplet in wetted contact with the third contact pad.

14. A method in accordance with claim 13, wherein the first optical path passes between the first contact pad and the second contact pad, further comprising
coupling a second input optical signal to a second input optical waveguide of the optical relay, the second input optical waveguide being optically aligned with a second output optical waveguide to form a second optical path through the switching channel between the first contact pad and the third contact pad, the second optical path being broken when the first optical path is completed and the second optical path being completed when the first optical path is broken.

15. A method in accordance with claim 12, wherein pressuring the actuation gas in the switching channel comprises:
if the optical path is to be completed:
energizing a first heater resistor in a first heater chamber, coupled by a first gas duct to the switching channel, to increase the pressure of the actuation gas in the switching channel between first and second contact pads; and
if the optical path is to be broken:
energizing a second heater resistor in a second heater chamber, coupled by a second gas duct to the switching channel, to increase the pressure of the actuation gas in the switching channel between the first and a third contact pads.

16. A method in accordance with claim 15, further comprising:
if the optical path is to be completed:
de-energizing the first heater resistor after the first liquid metal droplet has been moved out of the optical path; and
if the optical path is to be broken:
de-energizing the second heater resistor after the first liquid metal droplet has been moved into the optical path.

17. A method in accordance with claim 12, wherein pressuring the actuation gas in the switching channel comprises:
if the optical path is to be completed:
heating a first phase-change liquid in a first heater chamber, coupled by a first gas duct to the switching channel, to cause the first phase-change liquid to evaporate thereby increasing the pressure of the actuation gas in the switching channel between first and second contact pads; and
if the optical path is to be broken:
heating a second phase-change liquid in a second heater chamber, coupled by a second gas duct to the switching channel, to cause the second phase-change liquid to evaporate thereby increasing the pressure of the actuation gas in the switching channel between the first and a third contact pads.

18. An optical relay comprising:
a relay housing containing a switching channel;
first and second contact pads located in the switching channel and each having a surface wettable by a liquid metal;
a third contact pad located in the switching channel between the first and second contact pads and having a surface wettable by a liquid metal;
a first liquid metal droplet in wetted contact with the first contact pad;
a second liquid metal droplet in wetted contact with the second contact pad;
a third liquid metal droplet in wetted contact with the third contact pad and adapted to move within the switching channel to coalesce with one of the first liquid metal droplet and the second liquid metal droplet;
a first optical path passing through the switching channel between the first and third liquid metal droplets;
a first heater element operable to increase the pressure of a first actuation gas, thereby causing the first and third liquid metal droplets to separate and the second and third liquid metal droplets to coalesce; and
a second heater element operable to increase the pressure of a second actuation gas, thereby causing the second and third liquid metal droplets to separate and the first and third liquid metal droplets to coalesce,
wherein the first optical path is broken when the first and third liquid metal droplets are coalesced and is completed when the first and third liquid metal droplets are separated.

19. An optical relay in accordance with claim 18, the first heater element comprising:
a first heater chamber containing a first actuation gas;
a first gas duct coupling the first heater chamber to the switching channel between the first and third contact pads; and a first heater resistor operable to increase the pressure of the first actuation gas, thereby causing the first and third liquid metal droplets to separate and the second and third liquid metal droplets to coalesce; and the second heater element comprising:

a second heater chamber containing a second actuation gas;

a second gas duct coupling the second heater chamber to the switching channel between the second and third contact pads; and a second heater resistor operable to increase the pressure of the second actuation gas, thereby causing the second and third liquid metal droplets to separate and the first and third liquid metal droplets to coalesce.

20. An optical relay comprising:

a relay housing containing a switching channel;

first and second contact pads located in the switching channel and each having a surface wettable by a liquid metal;

a third contact pad located in the switching channel between the first and second contact pads and having a surface wettable by a liquid metal;

a first liquid metal droplet in wetted contact with the first contact pad;

a second liquid metal droplet in wetted contact with the second contact pad;

a third liquid metal droplet in wetted contact with the third contact pad and adapted to move within the switching channel to coalesce with one of the first liquid metal droplet and the second liquid metal droplet;

a first optical path passing through the switching channel between the first and third liquid metal droplets;

means for increasing the pressure of a first actuation gas to cause the first and third liquid metal droplets to separate and the second and third metal droplets to coalesce; and means for increasing the pressure of a second actuation gas to cause the second and third liquid metal droplets to separate and the first and third metal droplets to coalesce, wherein the first optical path is broken when the first and third liquid metal droplets are coalesced and is completed when the first and third liquid metal droplets are separated.

21. An optical relay in accordance with claim 20, wherein the means for increasing the pressure of the first actuation gas couples a first heater chamber to the switching channel between the first and third contact pads and the means for increasing the pressure of the second actuation gas couples a second heater chamber to the switching channel between the second and third contact pads.

* * * * *